(12) United States Patent
Gabrys

(10) Patent No.: US 6,788,029 B1
(45) Date of Patent: Sep. 7, 2004

(54) FLYWHEEL WITH SWITCHED COUPLING REGULATOR

(76) Inventor: Christopher W. Gabrys, 900 S. Meadows Pkwy. #3513, Reno, NV (US) 89511

( * ) Notice: Subject to any disclaimer, the term of this patent is extended or adjusted under 35 U.S.C. 154(b) by 39 days.

(21) Appl. No.: 10/284,974

(22) Filed: Oct. 30, 2002

Related U.S. Application Data

(60) Provisional application No. 60/350,131, filed on Nov. 2, 2001.

(51) Int. Cl.[7] .............................................. H02K 7/02
(52) U.S. Cl. .............................. 322/4; 322/25; 322/27; 318/161; 307/67
(58) Field of Search ................................ 322/4, 22–28; 310/74; 318/150, 161; 307/67–68

(56) References Cited

U.S. PATENT DOCUMENTS

| | | | | |
|---|---|---|---|---|
| 4,563,631 A | * | 1/1986 | Mashino et al. | 322/33 |
| 5,642,033 A | * | 6/1997 | Bartol et al. | 322/25 |
| 5,646,458 A | * | 7/1997 | Bowyer et al. | 307/67 |
| 5,796,240 A | * | 8/1998 | Saito et al. | 322/10 |
| 5,861,690 A | | 1/1999 | Post | 310/74 |
| 5,905,321 A | | 5/1999 | Clifton et al. | 310/178 |
| 6,124,702 A | | 9/2000 | Pinkerton et al. | 322/90 |
| 6,160,336 A | | 12/2000 | Baker, Jr. et al. | 310/74 |
| 6,240,337 B1 | | 5/2001 | Marr, Jr. et al. | 700/286 |
| 6,262,505 B1 | | 7/2001 | Hockney et al. | 310/90.5 |
| 6,486,627 B1 | * | 11/2002 | Gabrys | 318/161 |
| 6,495,929 B2 | * | 12/2002 | Bosley et al. | 290/52 |
| 6,720,674 B1 | * | 4/2004 | Gabrys | 307/68 |

* cited by examiner

Primary Examiner—Thanh Lam
(74) Attorney, Agent, or Firm—J. Michael Neary

(57) ABSTRACT

A flywheel energy storage device, for producing electrical power in an allowable range of operating voltages for an output load, includes an energy storage flywheel supported for rotation on a bearing system, and a brushless motor and a brushless permanent magnet generator for accelerating and decelerating the flywheel for storing and retrieving energy. The generator has a multiplicity of windings for producing output power from the generator by a magnetic coupling that provides output power DC voltage. An out regulator circuit provides variable DC voltage that is maintained within the allowable range for connected loads as the flywheel slows during discharging. The output regulator circuit includes electronic switches for switching connections of the windings to change the number of windings connected to the output to maintain output power DC voltage within the allowable range. The switching occurs less than once per every 10 revolutions of the flywheel.

18 Claims, 12 Drawing Sheets

FLYWHEEL WITH SWITCHED COUPLING REGULATOR

This is related to U.S. Provisional Application No. 60/350,131 filed on Nov. 2, 2001 and entitled "Flywheel With Switched Coupling Regulator".

This invention pertains to flywheel energy storage devices and more particularly to a flywheel device with an output regulator that produces a direct current output to a load, and maintains the direct current output voltage within an allowable range by switching the number of windings that couple to the load as the flywheel slows during a discharging. The invention provides for both higher efficiency, economy and reliability by eliminating the need for a high frequency output switching conversion.

BACKGROUND OF THE INVENTION

Flywheels have emerged as a very attractive energy storage technology for such electrical applications as uninterruptible power supplies, utility load leveling systems, alternative energy generation, satellites and electric vehicles, Flywheel systems convert back and forth between electrical energy and the rotational energy of a spinning flywheel. A flywheel energy storage system includes a flywheel, a motor and generator, a bearing system and a vacuum enclosure. The rotating flywheel stores the energy mechanically; the motor and generator converts between electrical and mechanical while the bearing system physically supports the rotating flywheel. High-speed flywheels are normally contained in a vacuum or low-pressure enclosure to minimize aerodynamic losses that would occur from operation in air at atmospheric pressure.

One typical requirement in the design of flywheel energy storage devices is to provide a near constant output voltage in order to power an electrical load as the flywheel speed slows during discharging. Unfortunately, as the speed of a flywheel slows, the voltage generated for a given generator field strength diminishes. For permanent magnet motor/generators, the field strength is constant so the voltage generated is directly proportional to the speed. Thus, if the flywheel slows to one quarter its full speed, the output voltage drops by a factor of four. Accordingly, the manufacturers of flywheel energy storage devices have used several methods for providing a near constant output voltage.

One such method has been to use an alternator type generator that uses a field coil for generation of the operating magnetic field. As the flywheel slows, the generator maintains a nearly constant output voltage by simply increasing the current to the field coil. This method is very simple, however it does have some drawbacks. The use of an electrically generated field requires a constant power draw and also potentially a magnetic circuit with higher magnetic losses from eddy currents and hysteresis depending on the design. These reduce the efficiency and require use of a larger flywheel if the expected discharge period is lengthy, up to several hours. Other potential drawbacks of alternator generators are significantly larger and heavier construction, smaller magnetic air gaps and generation of higher magnetic destabilizing forces that can make implementation of magnetic bearings, if used, more difficult.

Another prior art approach to the problem is the use of permanent magnet motor/generators with electronic switching conversion. Permanent magnet motor/generators, using permanent magnets to generate the magnetic field for operation, typically offer the highest efficiencies. Unfortunately, as previously explained, the output voltage from the generator falls as the flywheel speed slows. Electronic switching conversion can be used to provide a constant output voltage. One such prior art electronic switching conversion arrangement, shown in FIG. 1, is a power system 30 for providing back-up power to a protected load 29 from a flywheel energy storage device using an output DC-DC converter. The power system 30 has input power lines 31 energized from a source of power 39, such as the power grid, and output power lines 32 to the protected load 29. Input power in lines 31 is rectified by a rectifier 33 and provided to a DC buss 34. Power from the DC buss 34 is then provided to the output load 29 via output lines 32 through use of a DC-DC converter 38. Typical DC-DC converters chop the DC input 34 by switching, and put it back together as a regulated DC output power on lines 32. Switching of converters usually occurs at high frequencies, around 20 kHz.

In the event of loss of the primary input power from the source 39, back up power to the protected load 29, is provided by a flywheel motor/generator 37 driven by a flywheel in the flywheel energy storage device. A motor drive 35 connected to the DC buss 34 converts the DC to synchronous AC in lines 36 to energize the motor/generator 37 to accelerate the flywheel to its normal operating speed. When primary power in the line 31 is interrupted, the motor drive 35 instantly and automatically supplies power back to the DC buss 34 by rectifying the motor/generator AC power in lines 36. The power provided to the DC buss 34 falls as the flywheel speed is slowed. However, the DC-DC converter 38 converts the varying DC buss voltage 34 to a constant DC output in the lines 32. A special wide range DC-DC converter can be used to provide constant output voltage 32 during the entire useable flywheel discharge. Unfortunately, switching DC-DC converters typically have efficiencies that range from 75–90% efficiency. Even if the motor/generator has high efficiency, significant energy is lost in the output switching conversion to maintain the constant voltage. A second drawback of power systems with conventional converters is that the high frequency switching reduces the life of the electronics, which can limit the life of the flywheel energy storage device.

A second method for providing a constant output voltage while using a permanent magnet generator is to operate the motor drive in the fourth quadrant. A power system for a flywheel energy storage device using fourth quadrant power conversion of the motor drive inverter to provide output power is shown in FIG. 2. The power system 40 is comprised of a rectifier 43 that rectifies input power delivered from an input power source 41, such as a power grid, over lines 48, and supplies DC power to a DC buss 44, which is also the output to the load 42. Back up power is supplied through use of a flywheel motor/generator 47. A motor drive 45, connected to the DC buss 44, converts the DC power to synchronous AC to accelerate the flywheel motor/generator 47 to normal operating speed. During an interruption of primary power 41, the flywheel motor/generator 47 supplies the output power to the load 42 via lines 46 by reverse conversion from the motor drive 45. The motor drive 45 is a capable of fourth quadrant operation and hence it can actively slow the flywheel motor/generator 47 and in doing so, it can provide a constant and higher output voltage 42 than the back emf from the motor/generator. High frequency switching similar to that which is employed in the power system of FIG. 1 is used. Unfortunately, this power system 40 also suffers from similar power losses due to the high frequency switching and has the same life limitation considerations.

Thus, it would be very desirable to have a flywheel energy storage device with a power device that can employ a permanent magnet motor/generator and supply useable DC output power with high efficiency.

SUMMARY OF THE INVENTION

The invention provides a flywheel energy storage device with an output regulator that supplies direct current power to a load with high efficiency. The output voltage tolerated by many loads can be allowed to vary substantially, although not as much as would be encountered over an entire discharge from a flywheel with direct permanent magnet generator output. In telecommunications, one promising applications for flywheels and in many cases an application with a longer term discharge period, the voltage used by downstream equipment has an allowable range. Many DC telecommunications equipment for power of phone lines, wireless, Internet, etc., have embedded DC-DC converters. The DC-DC converters are provided so that the equipment can operate when batteries provide reserve power and the battery voltage falls during discharging, Most equipment has an allowable voltage range from either 40–60 volts or 20–30 volts. This substantial allowable operating voltage range, instead of requiring a specific voltage like 24 volts or 48 volts, allows an opportunity for designing a flywheel energy storage device to achieve a very high efficiency.

The output regulator in accordance with this invention maintains the output voltage within the allowable range by switching the number of windings or coil turns that couple to the load as the flywheel slows during a discharging. A permanent magnet generator attached to the flywheel produces AC voltage that varies in frequency and amplitude with the flywheel speed as it discharges. The output regulator switches to increase the number of windings that couple to the load during the discharge such that as the voltage falls to the lower end of the allowable range, whereupon it is instantly increased and then continues to drop again as the speed slows. The output regulator converts the generator AC to DC, and multiple turns of coils are combined electrically as the speed slows. The electrical coils switched are preferably located in the generator itself for simplicity and lower cost, however it is also possible to use an external transformer for switching of the magnetic coupling. No output DC-DC switching DC-DC converter is required and a high efficiency permanent magnet excited motor/generator can be used. Besides use for DC powered telecommunications equipment, the regulated DC output power can also power a standard inverter to power AC loads. Because most conventional inverters are designed to accommodate a voltage swing from batteries, the invention can be used to provide input power.

In one embodiment of the invention, the motor and generator are combined and the motor is accelerated to a higher voltage than the DC voltage required by output loads. The generator has multiple phases and each phase is separately rectified and smoothed to provide output power. Initially, output power is taken from only a single phase, however as the flywheel speed slows, the power from the other phases is added in series to maintain the output voltage within the allowable range. In other embodiments, multiple phases can be switched in parallel or power can be taken from only a single phase. The invention provides for both higher efficiency and reliability by eliminating the need for a high frequency output switching conversion while allowing use of a permanent magnet generator.

DESCRIPTION OF THE DRAWINGS

The invention, and its many attendant beneficial features, will become better understood upon reading the following description of the preferred embodiments in conjunction with the following drawings, wherein.

DESCRIPTION OF THE PREFERRED EMBODIMENT

Figure 1:
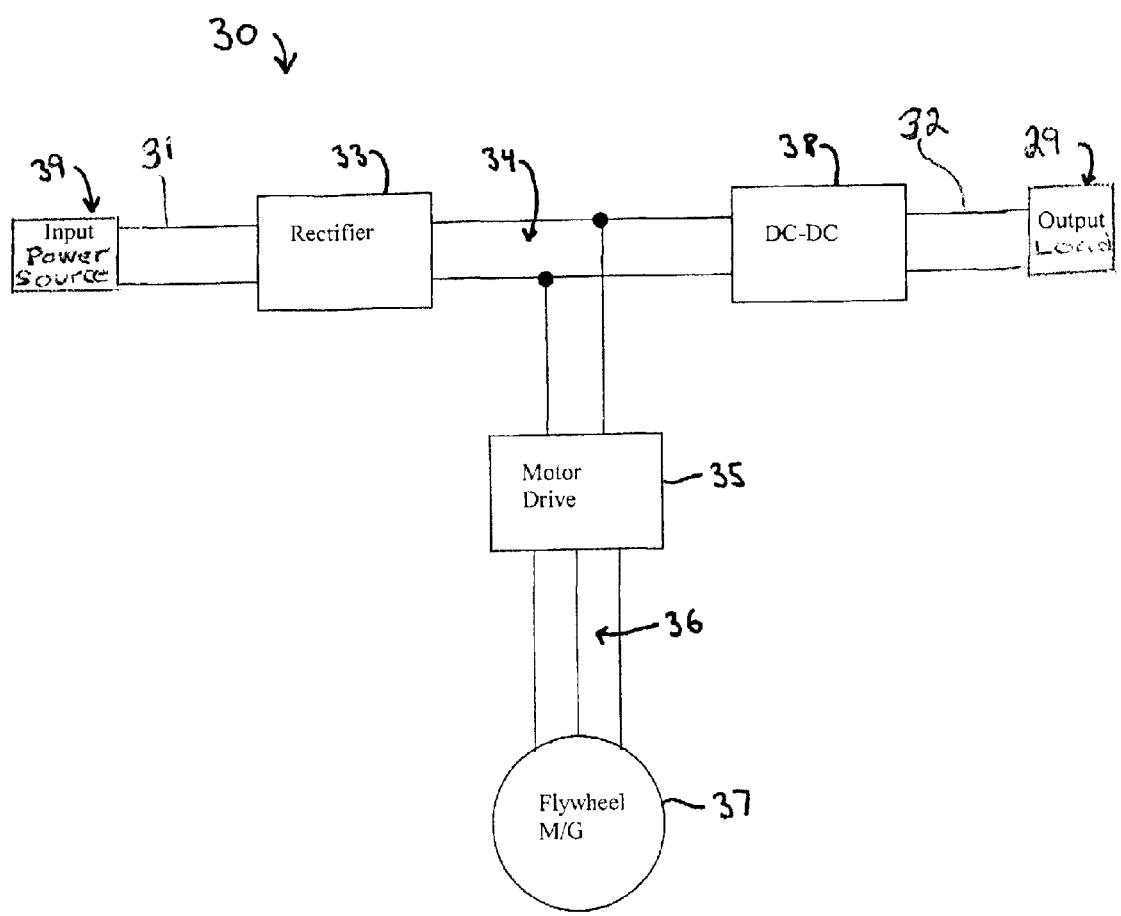
FIG. 1 is a schematic drawing of a prior art power system for a flywheel energy storage device using an output DC-DC converter.
Figure 2:
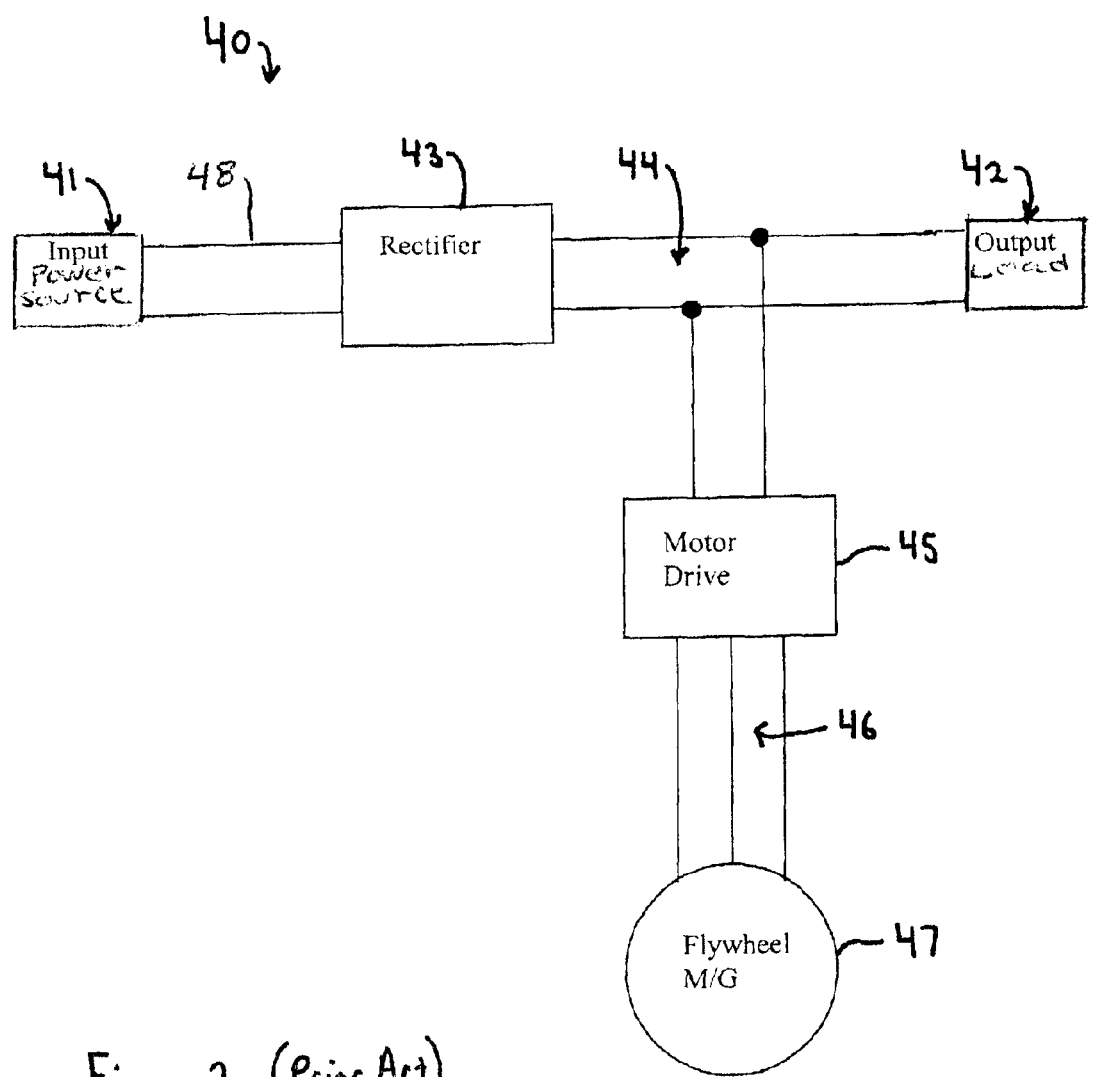
FIG. 2 is a schematic drawing of a prior art power system for a flywheel energy storage device using fourth quadrant power conversion of the motor drive inverter to provide output power.
Figure 3:
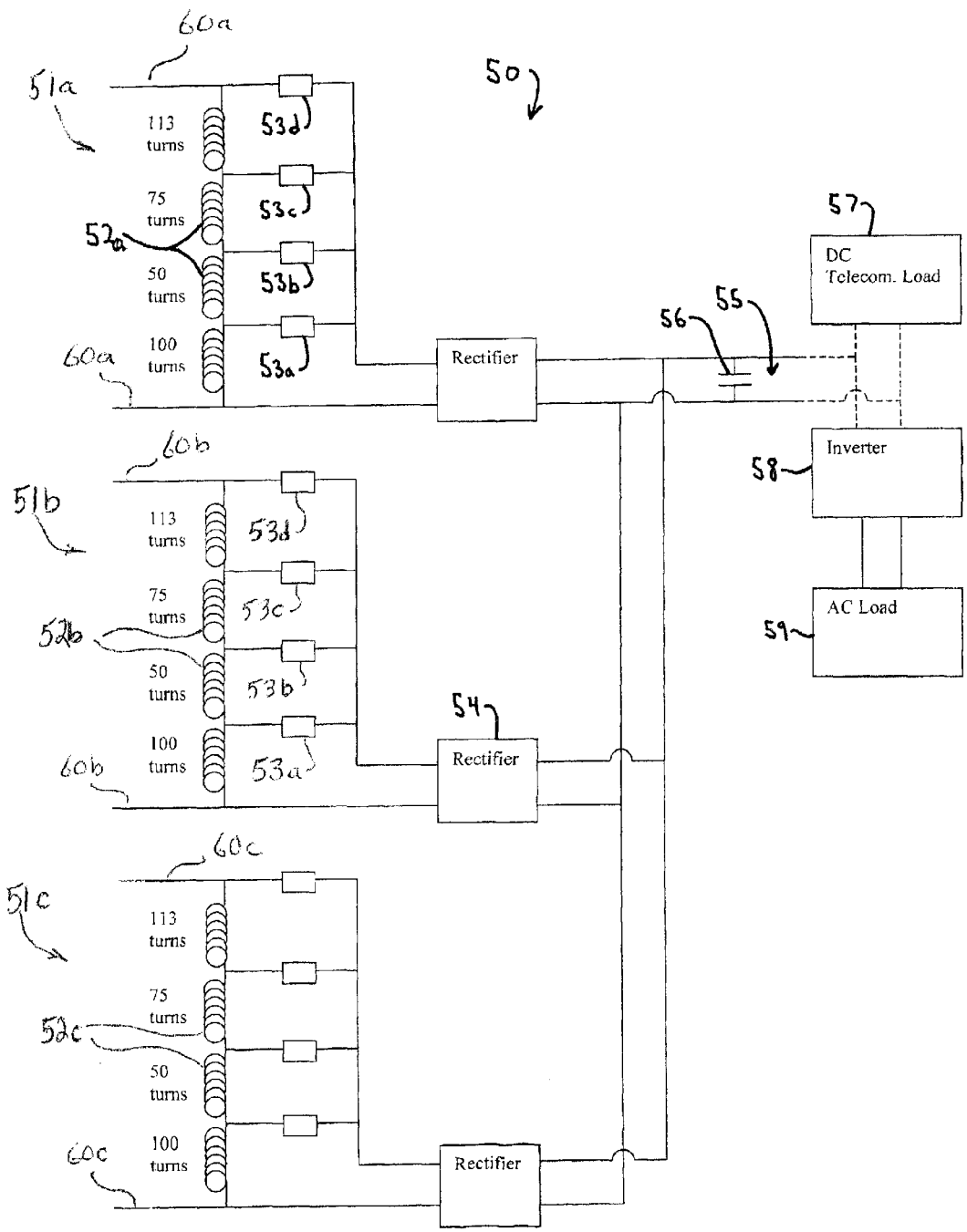
FIG. 3 is a schematic drawing of a switched coupling output regulator in accordance with the invention.

Turning to the drawings wherein like characters designate identical or corresponding parts, and more particularly to FIG. 3 thereof, a switched coupling output regulator 50 in accordance with the invention is shown for providing usable DC output power in output lines 55 during discharging of the flywheel system, not shown. The flywheel motor/generator has a multiple phase construction with three motor/generator phases 51$a$–$b$. In the configuration shown, the motor and generator coils 52$a$–$c$ are the same, however it is also possible that a separate motor, not shown, could be used for accelerating the flywheel. The motor is preferably a brushless type for long life and the generator is preferably a brushless permanent magnet type for long life and high efficiency. Synchronous AC power is supplied to the 3 sets of motor/generator leads 60$a$–$c$ to energize the armature coils 52$a$–$c$ to accelerate the flywheel. When primary power, not shown, is interrupted, power to the motor/generator leads 60$a$–$c$ is also interrupted. The flywheel system discharges to provide output power through output leads 55.

The output power is supplied without the use of a switching DC-DC converter. For DC telecom loads, it is unnecessary that the output voltage in output leads 55 be constant. In loads such is this, the DC voltage can vary substantially within an allowable range. If the output 55 is connected to DC telecommunications equipment 57, the voltage is typically allowed to vary from around 40 to 60 volts or 20 to 30 volts for wireless equipment. The allowable voltage range, in the case of the telecommunications equipment 57, is the result having embedded DC-DC converters, not shown. The DC-DC converters allow the equipment 57 to operate when batteries are used to provide reserve power, which is the usual case.

If the output in lines 55 is to be used to power an AC load 59, a standard inverter 58 can be connected to the output lines 55. Inverters, which are also designed to be powered from batteries with a varying voltage level, can also have a substantial allowable input voltage range. An allowable range of operating voltages for the output loads 57, 58, instead of a required specific set voltage, is key to the operation of the invention. For industrial applications, the voltage specified for the AC load 59 is typically on the order of 480 volts. In this case, the voltage at the output in the output lines 55 would be allowed to vary substantially, on the order of 400–600 volts, and the inverter 58 would deliver AC power at the specified voltage required by the load 59.

Because the loads 57, 58 connected to the output lines 55 can tolerate an operational voltage that varies substantially, the output regulator 50 need not contain any switching DC-DC converters and the generator can be a high efficiency permanent magnet type. The output regulator 50 circuit provides an output DC voltage in output lines 55 that is maintained within an allowable range for the connected loads 57 or 58 as the flywheel slows during discharging. The DC voltage 55 is maintained within the allowable range by switching the connection of the number of windings 52 of the generator that provides output power 55. As the flywheel system discharges, more windings 52 of the generator are added to maintain the voltage in the output lines 55 within the desired range. At any particular number of windings coupled to the output lines 55, output voltage decreases as the speed slows. When the output voltage 55 falls to a level close to the lower end of the allowable range, more windings 52 are connected and the output voltage is increased to near the upper end of the allowable range. As the speed continues to slow, the output voltage falls and sequentially more windings 52 are added to maintain the allowable output voltage 55.

The windings 52a–c for each phase are connected using switches 53a–53d and rectifiers 54 rectify the AC generator voltage to DC. A capacitor 56 smoothes the DC output in the output line 55. As shown in this configuration, each phase 51a–c has four coils 52a–c, however more or fewer coils could be used. Also, the windings 52a–c of each phase 51a–c are switched simultaneously by the switches 53a–d and are connected in parallel, although power could be taken from only a single phase if desired. The switches 53a–53d can be simple relays or semiconductor transistors or switches well known in the art.

The functioning during a flywheel discharge occurs as follows: Switch 53a is closed to provide output power in the output line 55 from the first coupled coil, shown as the 100 turn coil, in each of the three phases. When the flywheel slows enough that the output voltage in the output line 55 falls to near the lower end of the allowable range, switch 53b is closed and 53a is opened so that both the first and second coils (100 turns and 50 turns in the example of FIG. 3) are coupled to the output, and the output voltage is instantaneously increased to the upper range of the allowable voltage range. The process continues until switch 53d is closed and the output voltage subsequently drops below the allowable operating voltage. Because of the high rotational speeds of flywheel systems, switching would typically occur less than every ten revolutions of the flywheel. More likely, switching occurs less than every hundreds of thousands of revolutions or millions of revolutions. Because the switches 53a–53d only cycle during a discharge and only cycle once per discharge, their estimated life is extremely long and low cost switches can be employed. The switches 53a–53d can be triggered by the voltage level detected at the output 55 or across a single coil 52 or alternatively by the flywheel speed.

If the phases 51a–c are independently connected in the motor drive, not shown, the rectifiers 54 can be full wave bridge rectifiers for more power transfer to the output 55. If the phases are connected in a wye or delta arrangement in the motor drive, not shown, single diode or half wave rectifiers can be used.

Figure 4:
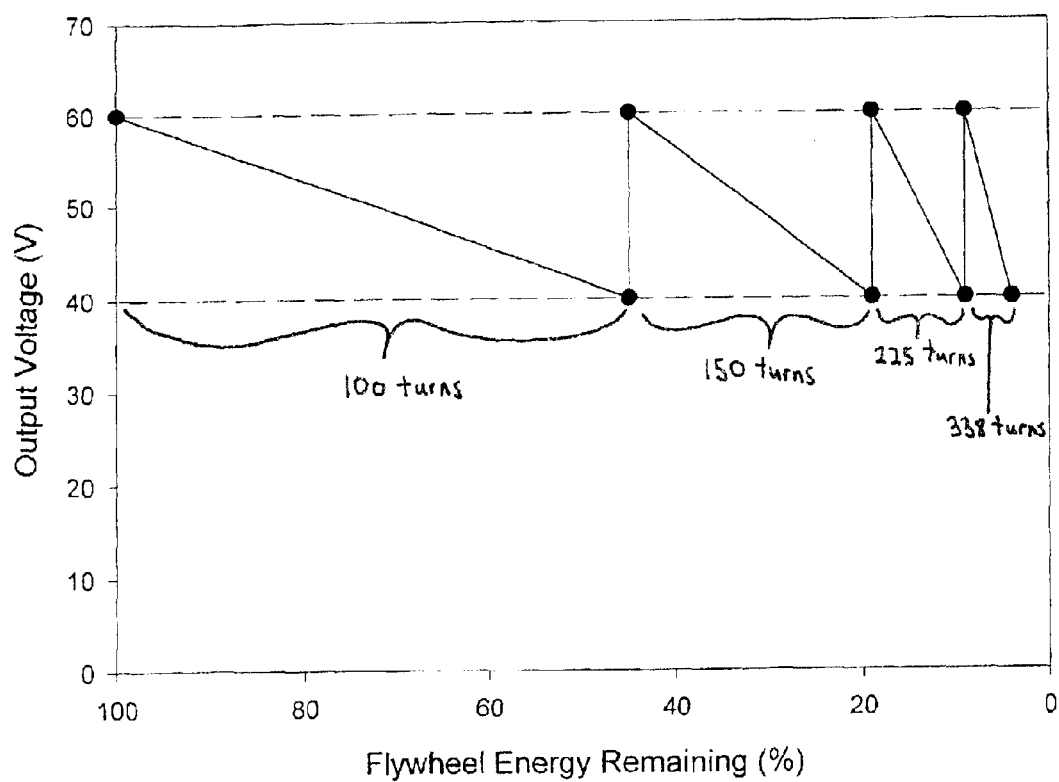
FIG. 4 is a graph of output voltage versus flywheel energy remaining with use of the output regulator of FIG. 3.

The output voltage, varying between upper and lower limits as the energy remaining in the flywheel declines in a flywheel energy storage system using the output regulator of FIG. 3, is shown in a graph in FIG. 4. The number of windings in the coils 52a–d shown in FIGS. 3 and 4 is only illustrative and can be changed to suit the application. The ratios of the number of windings 52 were chosen to maintain the output voltage 55 between a 60 and 40 volt range during a discharge. In this case, the flywheel is charged on 202 volts from the motor drive phase leads 60a–c. The power is applied across all of the windings 52a in series, however power could alternately be applied across only some of the coils 52 for accelerating the flywheel at a slower rate of acceleration using less power.

When the flywheel discharges, switch 53a is closed and 100 windings provide the output power 55. The output voltage initially starts out at 60 volts and it decreases as the flywheel speed slows. With 45% of the flywheel energy remaining, the output voltage falls to 40 volts, whereupon switch 53b is closed, and 53a is opened. The voltage generated is now across 150 turns and hence is again at 60 volts. The voltage falls again as the flywheel slows, finally reaching 40 volts with 30% of the flywheel energy remaining, whereupon switch 53b is opened and switch 53c is closed, raising the output voltage again to 60 volts across 225 turns. The process continues until the output is being provided by the series combination of all of the coils. The voltage then falls below 40 volts with only 4% of the flywheel energy remaining.

Unlike power systems employing output DC-DC converters where the coil current continually increases during the discharge, the coil current in the invention stays within a range similar to the voltage. Coil current is responsible for the resistive generator heating.

The construction is also very simple and low in cost. Although shown for a voltage range of 60–40 volts, other voltage levels and ranges could alternatively be used. The voltage preferably varies from a high voltage between two and ten times during a full discharge of the flywheel for extraction of most of the flywheels energy. Likewise, the DC voltage preferably varies more than 5% but less than 35% from its maximum voltage when maintained within the allowable range during discharging of the flywheel energy storage device.

Figure 5:
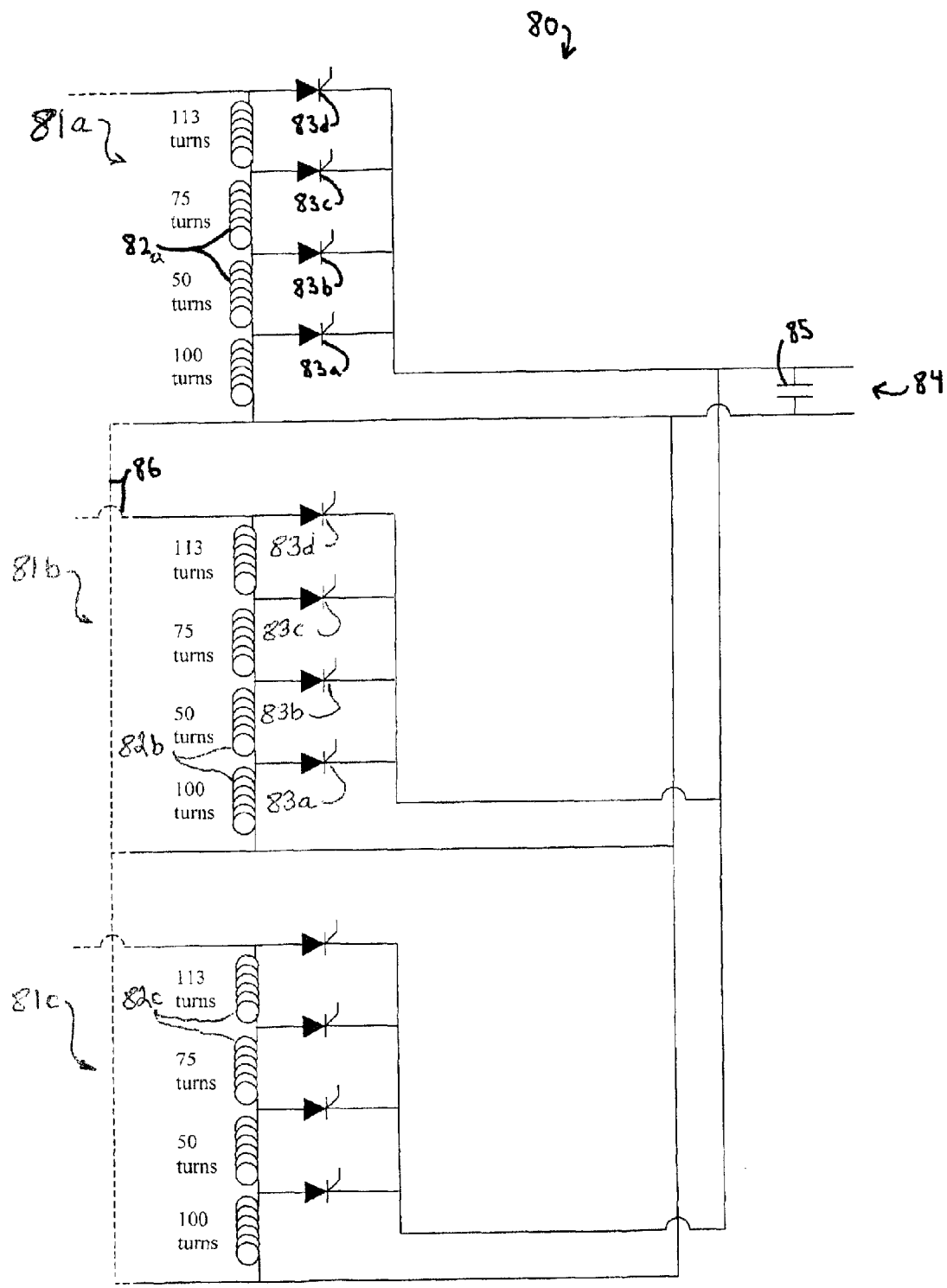
FIG. 5 is a schematic drawing of an another configuration switched coupling output regulator in accordance with the invention.

Another configuration switched coupling output regulator 80, in which the rectifiers and switches are combined, is shown in FIG. 5. The regulator 80 is has multiple phases 81a–c of motor/generator coils 82a–c. In this case, thyristors 83a–83d are used to both rectify and connect the voltage across coils 82a–c to an output load 84. A capacitor 85 provides smoothing of the DC voltage. Thyristors have the advantage of being capable of natural commutation such that, without a gate signal, they will turn off at zero current and/or zero voltage. This reduces the stress and noise generated during switching. Thyristors are also readily available in high current and voltage ratings at relatively low cost. Other types of semiconductor switches could also be applied. Because the thyristors 83a–83d only rectify half of the generator AC voltage produced from the coils 82, the input phases can be connected in a wye configuration 86 if desired. It is also possible to use controlled full bridge rectifiers with multiple thyristors for the purpose of transmitting generated power from both positive and negative half cycles of the AC generated by the coils 82. Such an arrangement would require independently wired phases for the motor to prevent shorting out of some of the thyristors.

The configurations shown in FIGS. 3 and 5 have combined power generated by multiple phases of coils in parallel to provide output power. It is also possible to have a switched coupling regulator that that combines voltages produced by different phases in series to provide output power, as illustrated in another configuration switched coupling output regulator 90 shown in FIG. 6. Again the motor/generator is shown combined and having three phases 91a–c. It is also possible to use a separate motor or to have more or less phases that couple power to the output. The three phases 91a–c can be connected in a delta configuration 97 if desired. The regulator 90 combines voltage generated from coils 92a–92f electrically in series to provide output power 96. When initially starting discharge of the flywheel from full speed, switch 95a is closed and voltage from coil 92a is connected through the switch 95a to a load through output lines 96. The AC voltage generated from 92a is rectified by a rectifier 93 and smoothed by a capacitor 94 to produce DC output power in the output lines 96. As the speed falls, the voltage induced in the coil 92a also falls, and when the output voltage reaches a lower predetermined set point near the lower end of the allowable voltage range, switch 95b is closed and switch 95a is opened, thus increasing the output voltage, as shown in FIG. 7. As the speed continues to decrease, coil 92c is added to provide increased output voltage. However, coils 92c and 92d produce AC voltage that is out of phase with the voltages produced by 92a and 92b. To combine out of phase coils 92a–92f for maximum increase in the output voltage, the coil voltages are rectified and smoothed by rectifiers 93 and capacitors 94 prior to combining them in series. As the speed slows, coil 92f and switch 95f are eventually closed. One of the benefits of this arrangement is a large capability of energy withdrawal from the flywheel with a limited number of coils. Also, there is possibility for a large range of output voltages. Although shown with two coils per phase, more or fewer coils could be used. As arranged, the closing of the switches will keep the output voltage 96 within the desired range.

Figure 6:
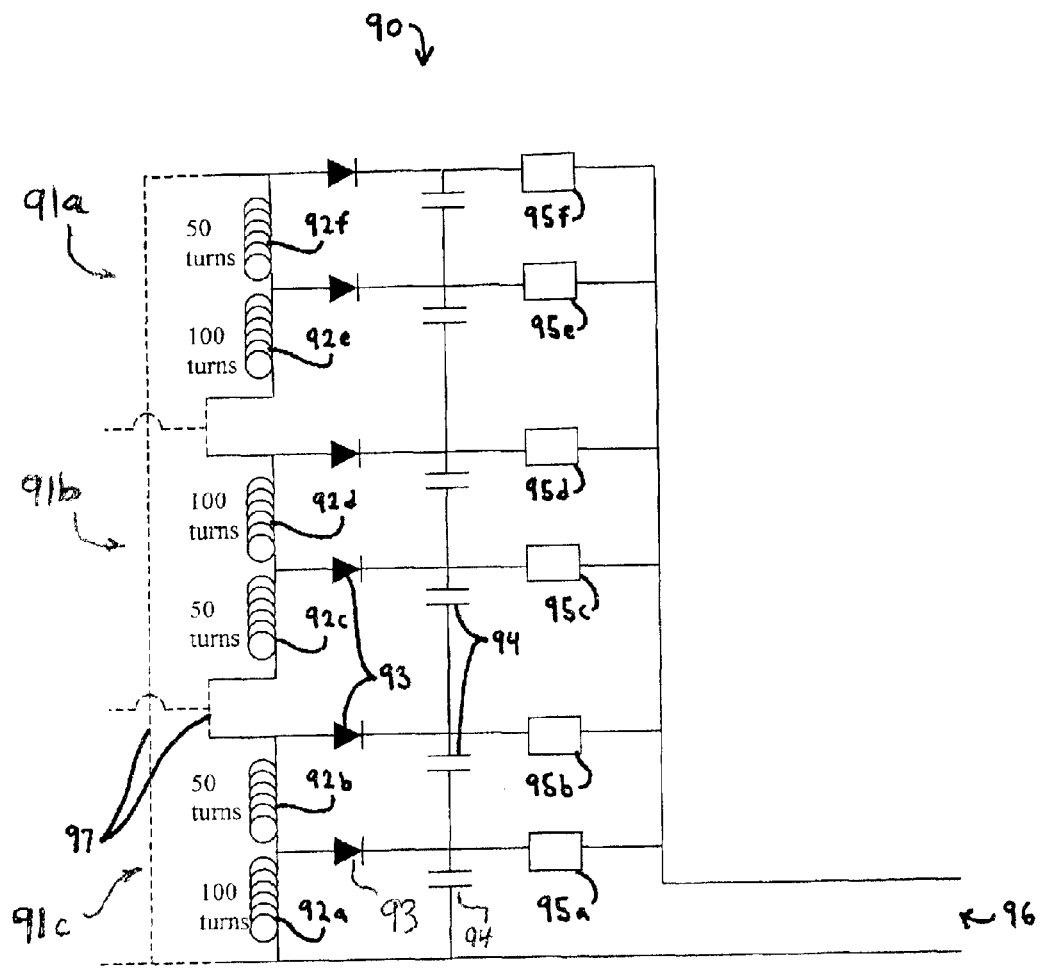
FIG. 6 is a schematic drawing of a second alternate configuration switched coupling output regulator in accordance with the invention.
Figure 7:
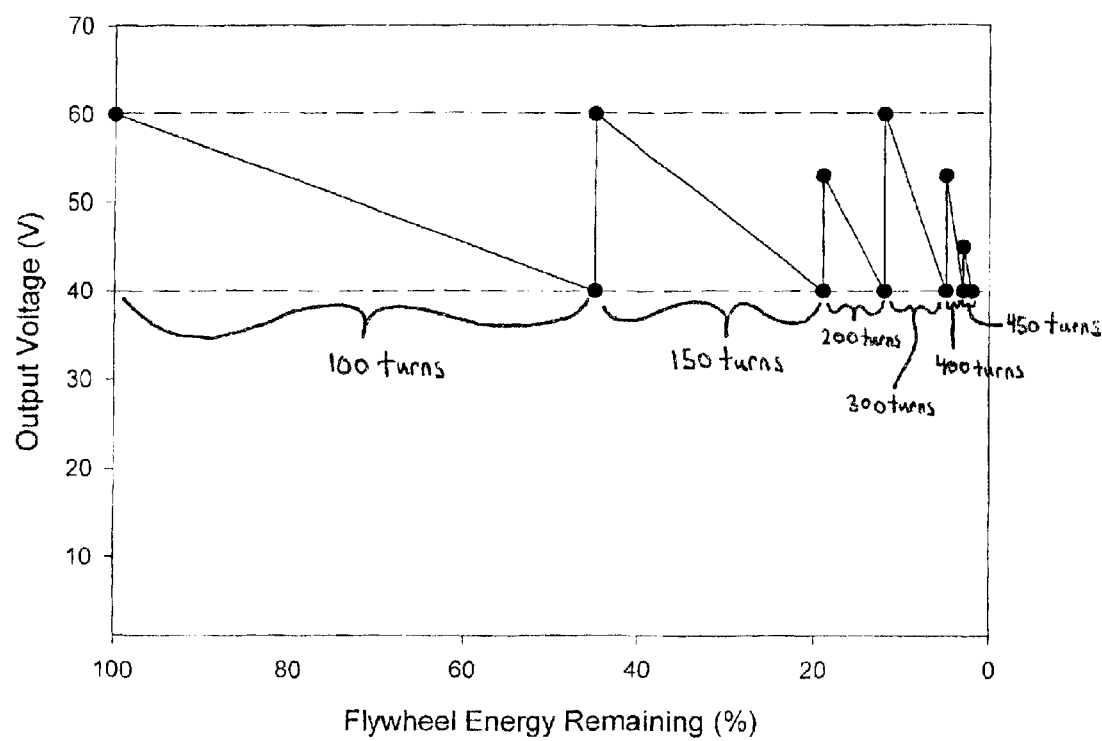
FIG. 7 is a graph of output voltage versus flywheel energy remaining with use of the output regulator of FIG. 6.

The output voltage versus flywheel energy remaining with use of the output regulator 90 of FIG. 6 is shown in FIG. 7. The output voltage is initially at 60 volts when the flywheel starts discharging. The second coil 92b is switched to couple to the load at 45% of the flywheel energy remaining. The third coil 92c, from the second phase 91b, is switched to be added in series with 19% of the flywheel energy remaining. Notice from FIG. 6 that each phase is wound with the same number of turns, however, the 50 turns of coil 92c are added prior to the 100 turn coil 92d. This insures that the voltage does not exceed the 60 volt maximum of the allowable range. When coil 92c is added, the voltage only increases to 53 volts instead of 60 volts. The process continues until 92f is added and the voltage subsequently falls below 40 volts with only 2% of the flywheel energy remaining. For some of the later coils 92c, 92e and 92f, the voltage never increases to the maximum output energy per number of coils switched. When the voltage suddenly is increased in any of the switched coupling regulators in accordance with the invention, a current limiting device, not shown, may be added to the output lines 96 to prevent surge currents. However, most load equipment or inverters have such protection already internal, so it would be unnecessary to add a current limiter to the switched coupling output regulator 90.

Figure 8:
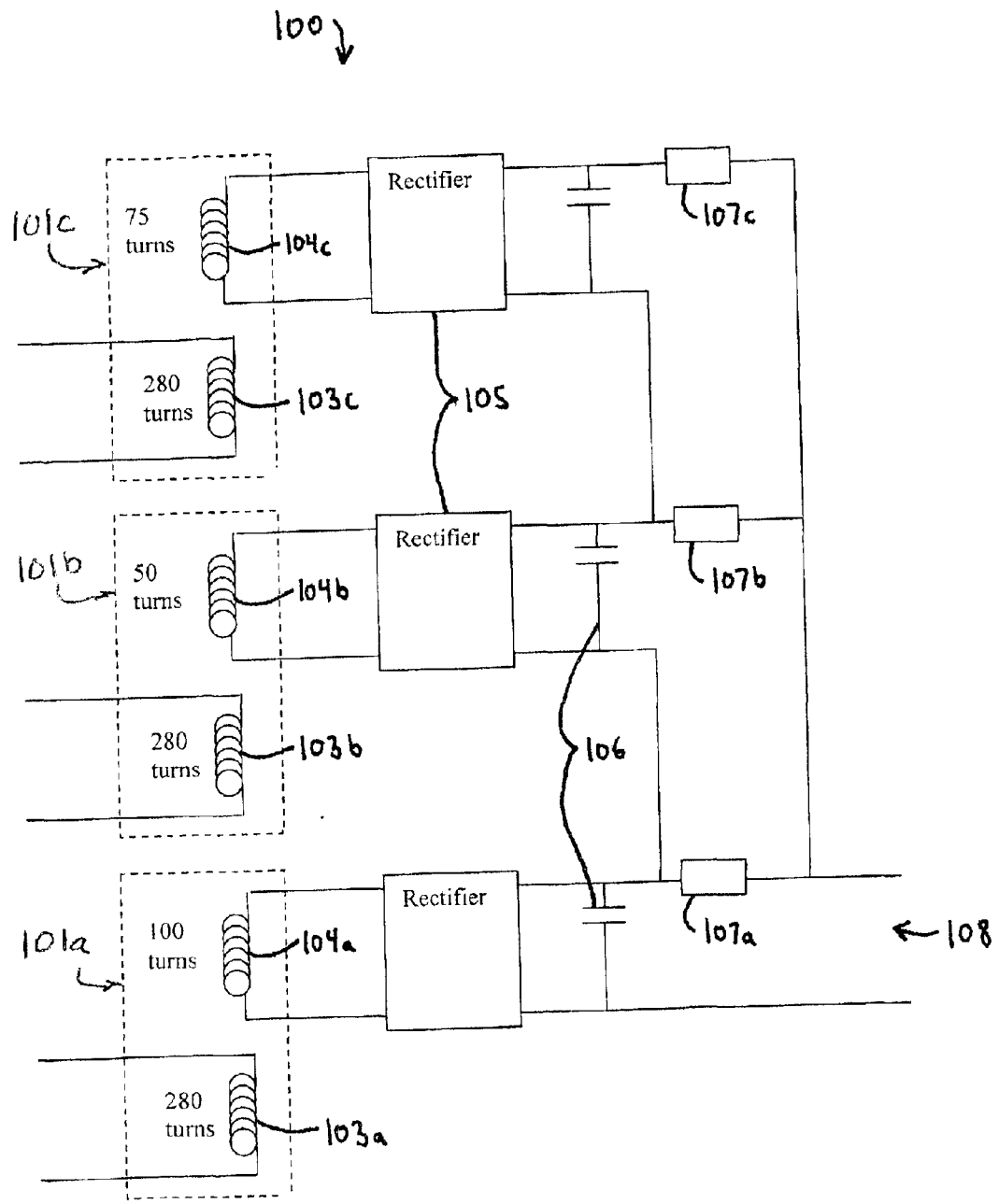
FIG. 8 is a schematic drawing of a third alternate configuration switched coupling output regulator in accordance with the invention.

Several more aspects of the invention are illustrated in FIG. 8, which shows a switched coupling output regulator 100 having multiple phases 101a–c, and each phase 101a–101c has electrically independent motor coils 103a–103c and generator coils 104a–104c. The motor and generator can be combined into a single unit, which saves cost, or they can be separate units. The use of independent motor and generator coils has several advantages and is very easy to implement. The coils are electrically isolated which can make construction of a complete flywheel power system easier. The isolated coils also allow the motor coils 103a–103c to be connected in any arrangement and still be used with the system. Finally, the isolated coils allow the generator coils to be made of the exact desired number of turns each for maximizing the energy extraction capability of the flywheel per number of switches, wires, connections and electrical feedthroughs in the flywheel system The motor coils 103a–103c all have the same number of turns for a balanced motor. The independent coils also allow the input and output voltages to be whatever levels are desired. Higher output voltages or input voltages can better match the load or result in less losses and smaller wire diameters. Use of isolated motor and generator coils could also be applied with the previous and other configurations for the same benefits.

As shown in FIG. 8, the motor and generator are combined with motor coils 103a–103c wound together but electrically isolated from generator coils 104a–104c. The motor is accelerated on 170 volts, which is the result of simple rectified 120 volts AC. The first generator coil 104a has 100 turns compared to the 280 turns in the motor coils 103a–103c. The result is that the generator starts outputting 60 volts when coil 104a is coupled to provide output power to the output lines 108 at the start of a discharge. The output of the coils 104a–104c are each rectified using rectifiers 105, which can be a full bridge type. The DC voltages are the smoothed with capacitors 106 and combined in series at the output 108 through switches 107a–107c. As in previous configurations, more than one generator coil per phase can be used if desired but this may increase complexity and cost.

The numbers of turns in the generator coils 104a–104c are chosen such that the output voltage 108 is maintained within the allowable range during the discharge. The first coil 104a in the example shown in FIG. 8 allows extraction of energy until 45% of the flywheel energy is left. The second coil removes energy until 19% of the energy remains. The third coil removes energy until only 9% of the flywheel energy is still left.

The simplicity of this regulator 100 and also the other configurations 50, 80 and 90 allows for a very low number of electrical connections and electrical feedthroughs into the vacuum chamber in which the flywheel is mounted for rotation. Alternatively, the low number of cycles and high reliability of the electronics can allow the entire regulator to be included inside the flywheel system containment vessel as it is unlikely to require replacement over the life of the flywheel device. This can allow for simpler installation and lower costs.

Figure 9:
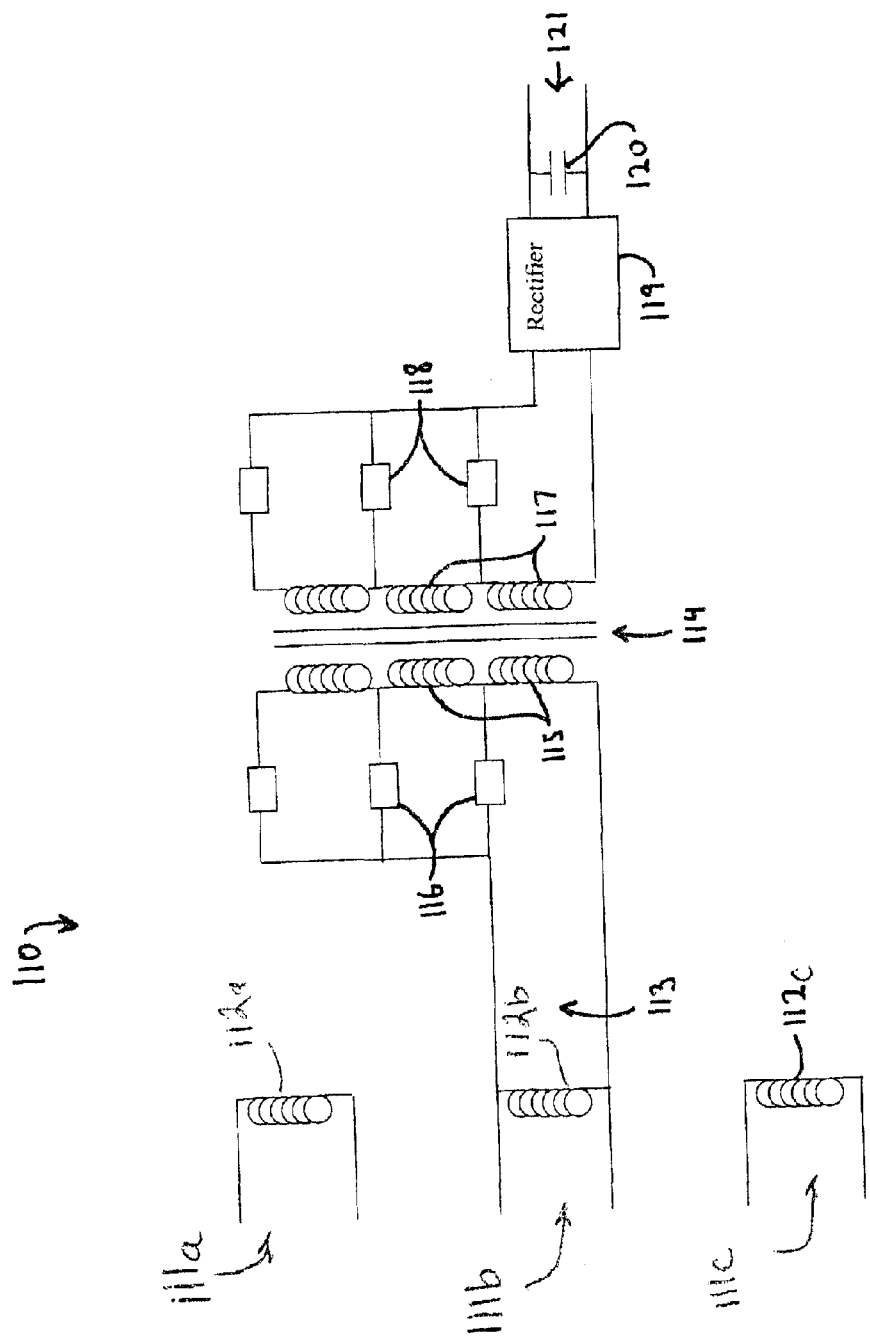
FIG. 9 is a schematic drawing of a fourth alternate configuration switched coupling output regulator in accordance with the invention.

Another method and apparatus for switching the windings in a magnetic coupling that provides output power is to use an added transformer, as illustrated in a switched coupling output regulator 110 shown in FIG. 9. The switched coupling regulator 110 is comprised of multiple motor/generator phases 111a–c having coils 112a–b. As the speed of the flywheel slows during a discharge, the voltage across each of the coils 112a–b falls. The output power in output lines 121 is maintained within an allowable voltage range with a transformer 114. The transformer 114, as shown, is connected to only a single phase 111b to extract power, however a multiple phase transformer or multiple transformers could alternately be used. The transformer 114 is preferably a high frequency type so that it can function with minimal losses at the high generator frequency. The transformer 114 is shown with multiple primary and secondary taps or coils 115, 117. However, a transformer with only multiple primary or secondary could be used instead. Voltage is switched to the desired primary coils 115 using switches 116 and/or is switched from the secondary coils 117 using the switches 118 to maintain the output voltage within the allowable range. The transformer 114 provides the magnetic coupling between the primary 115 and secondary 117 coils. The voltage from the transformer 114 is rectified using a rectifier 119 and smoothed with a capacitor 120 to provide output power in the output lines 121. Besides a single capacitor 120, other types of filters could also be employed including ones with inductors and others well known in the art. The transformer 114 can provide isolation between the motor coils 112a–c and the output 121 and can allow for any desirable output voltage 121. Use of a transformer would typically result in more costs and higher losses, however it can allow for less electrical feedthroughs into the flywheel device vacuum and can allow for versatility in the output voltage and allowable range.

Figure 10:
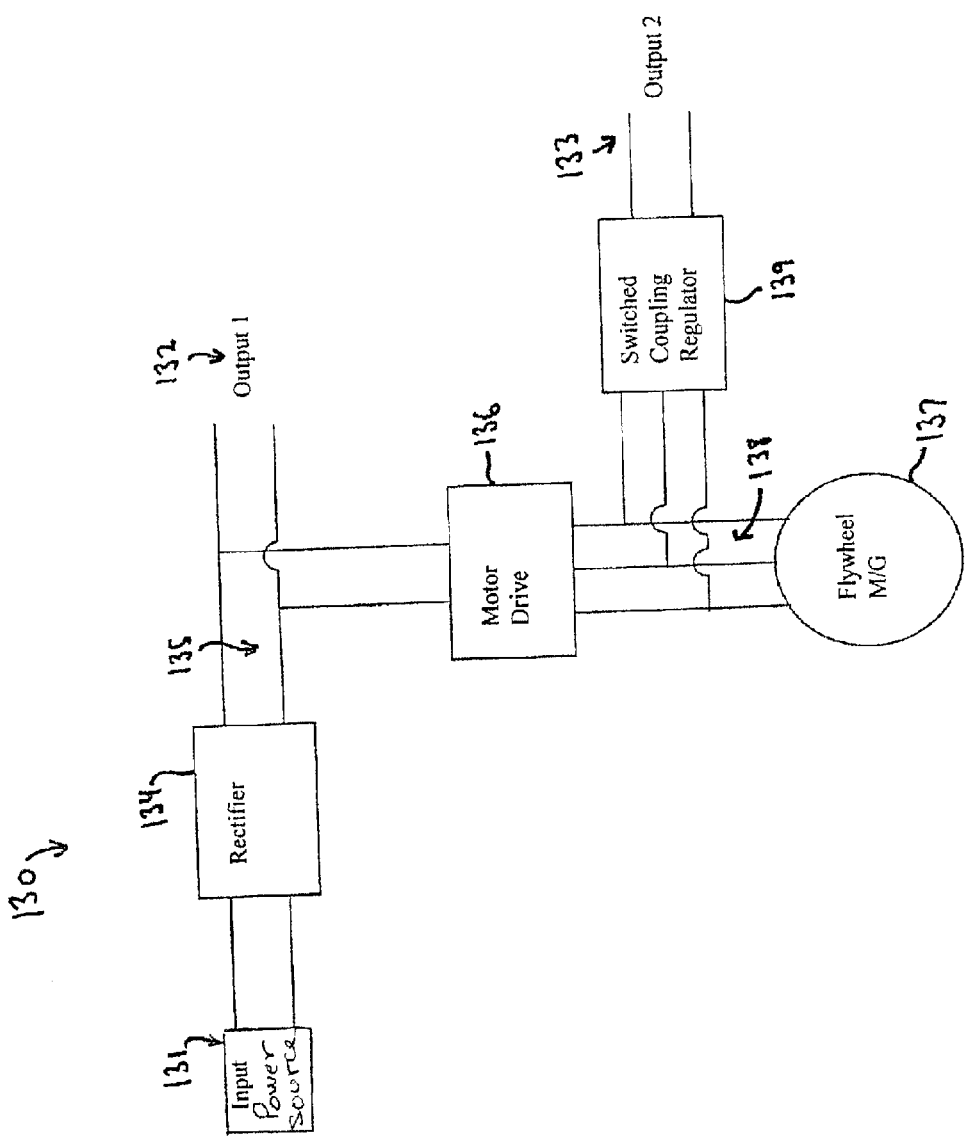
FIG. 10 is a schematic drawing of a power system for a flywheel energy storage device using a switched coupling regulator in accordance with the invention.

A configuration of a power system for a flywheel energy storage device using a switched coupling regulator in accordance with the invention is shown in FIG. 10. The power system 130 is connected to a source 131 of input power, which is typically utility AC power, although other power sources could be used. The power from the input power source 131 is rectified using a rectifier 134 and supplied to a DC buss 135. The rectifier 134 can be a simple uncontrolled type or a switch mode rectifier typically employed in telecommunications. The flywheel motor/generator 137 is used to provide reserve power when the utility power source 131 fails. It is also possible to use the power system 130 for storing power from alternative energy generation, in which case the loss of input power 131 would be the result of cessation or lull in generation. The flywheel motor/generator 137 can provide reserve power by several different possible configurations. The dc buss 135 can directly supply a load through the first output 132 when utility power is functioning. Power in the DC buss 135 also accelerates the flywheel motor/generator 137 through a motor drive 136 that creates AC power in lines 138 to drive the motor of the motor/generator 137. The flywheel motor/generator 137 then supplies output power at the second output 133 through a switched coupling regulator 139 in accordance with the invention. The second output 133 can be connected to the first output 132 through a transfer switch or a diode that allows power to flow from output 133 to output 132 and the connected load, not shown. Other connection methods could also be employed. Instantaneous losses of power to the load are preferably prevented when utility power 131 is lost. An alternative configuration in which the load, not shown, is directly connected to output 133 can also be used. In this configuration, the load is continuously powered from the switched coupling regulator 139, preventing interruptions of power.

Figure 11:
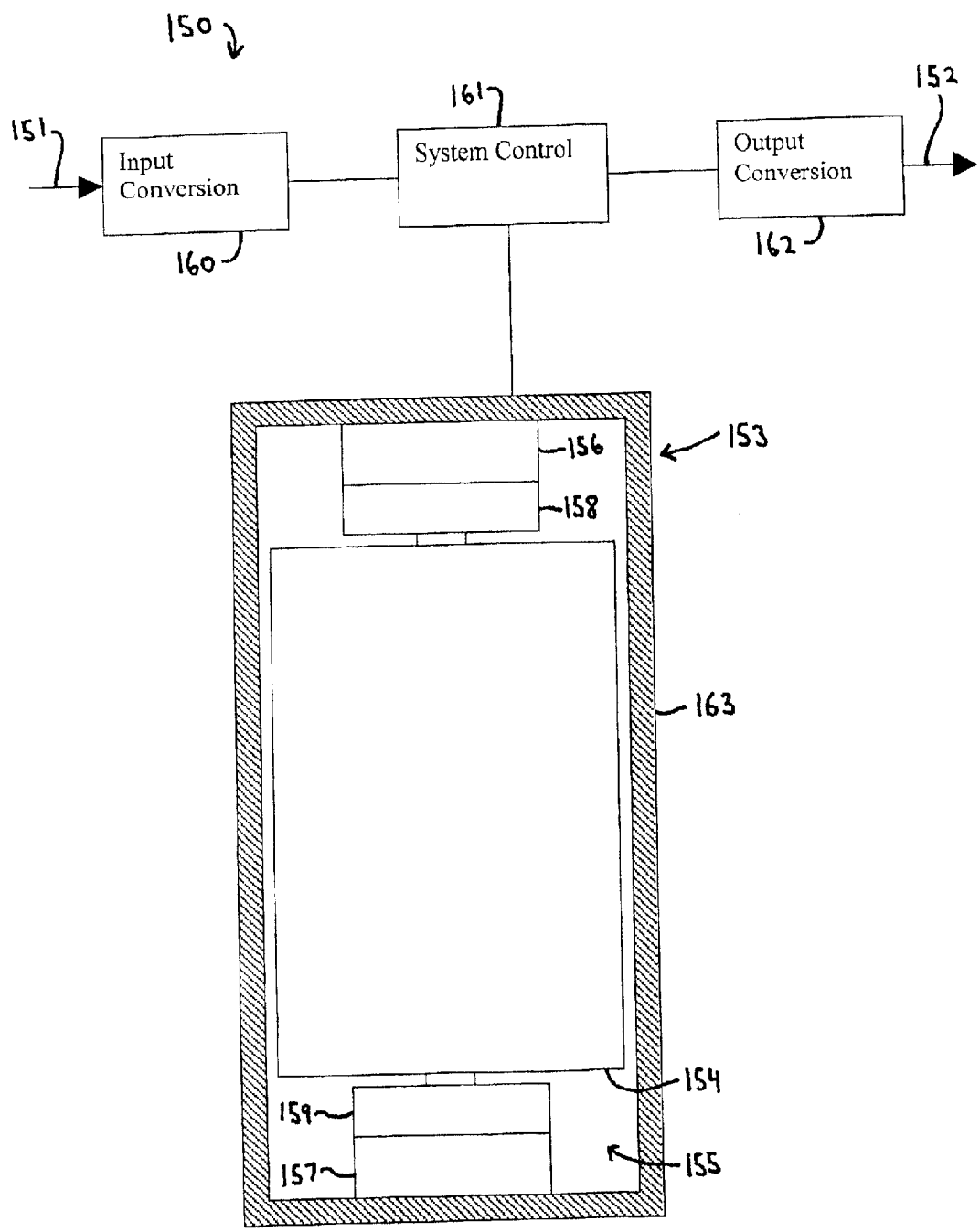
FIG. 11 is a schematic drawing of a flywheel energy storage device accordance with the invention.

A flywheel energy storage device 150, shown in FIG. 11, includes a flywheel primary unit 153 having a flywheel 154 that is housed in a container 163 with an evacuated internal chamber 155 to reduce aerodynamic drag on the spinning flywheel 154. For slower flywheels, a helium atmosphere could be employed instead of a vacuum. The flywheel 154 is supported for rotation about a vertical axis on bearings 156 and 157. The bearings can be magnetic, mechanical, a combination of mechanical and magnetic, or other arrangements known in the art. As shown, the flywheel has a separate motor 158 and generator 159. The motor 158 and generator 159 may be combined into a single unit to reduce costs, although being separate may provide advantages in some cases such as providing isolation or use of a different type of motor such as induction type. The flywheel 154 is accelerated for storing energy by the motor 158, and is decelerated for retrieving energy by the generator 159. Both the motor 158 and generator 159 are preferably brushless types for long life and the generator 159 preferably also uses permanent magnets to achieve high efficiency.

The flywheel device 150 is controlled through use of a system control 161 connected to the primary unit 153. The system control 161 could alternatively be located inside the primary unit 153. Input power 151 is modified through input conversion 160, which can include a rectifier and motor drive, not shown. The flywheel energy storage device 150 then provides output power 152 through output conversion 162. This can include the switched coupling output regulator, not shown, that maintains the output voltage 152 within the allowable range of connected loads, not shown, to the output 152.

Figure 12:
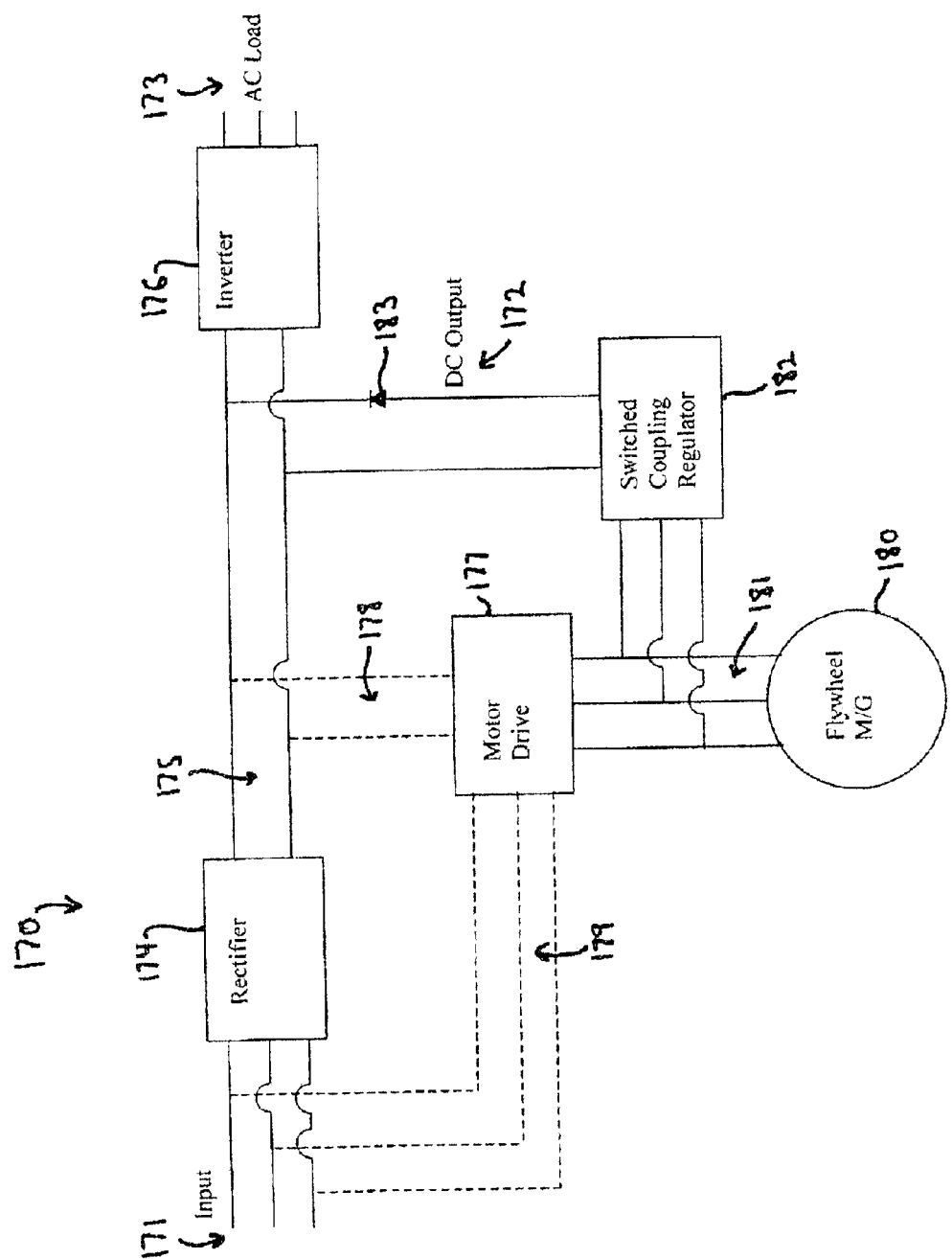
FIG. 12 is a schematic drawing of an alternate configuration power system for a flywheel energy storage device using a switched coupling regulator in accordance with the invention.

A flywheel energy storage system 170, shown in FIG. 12, is connected to input lines 171 from a source of AC power, and functions as an uninterruptible power supply. The input power in lines 171 is rectified by a rectifier 174 and supplied to a DC buss 175. An inverter 176 connected to the DC buss 175 converts the DC power in the DC buss 175 to AC power to drive an AC load 173. Alternatively, a different DC load, not shown, could be connected to the DC buss 175 instead of the inverter 176 and connected AC load 173.

A flywheel motor/generator 180 is used to provide back up power to the AC load 173 in the event of an interruption of the input power 171. The flywheel motor/generator 180 is accelerated by the motor/generator 180, the windings of which are energized by synchronous AC power supplied from a motor drive 177. The motor drive 177 is powered either from a connection 178 to the DC buss 175, or alternatively from a connection 179 to the input lines 171 from the primary power. During an interruption of input power in the lines 171, power is supplied to the DC buss 175 and hence to the load comprising the inverter 176 and external AC load 173 through a switched coupling regulator 182 connected to the generator windings 181. The switched coupling regulator 182 provides a DC output on lines 172 that varies within an allowable range as the flywheel slows. The DC output 172 lines are connected to the DC buss 175 to maintain power to the loads 176, 173. An optional diode can be used between the DC output 172 and the DC buss 175 to prevent backflow from the DC buss 175 to the switched coupling regulator 182 during normal operation of input power 171. The diode 183 may not be required depending on the sensor control method utilized for the switched coupling regulator 182.

In this configuration, the voltage of the DC output 172 is preferably lower than the voltage of the DC buss during normal operation of input power 171. This allows the rectifier 174 to supply the power to the DC buss 175 and reduces or eliminates loading on the motor drive 177 and switched coupling regulator 182 for long life and potentially increased efficiency.

Obviously, numerous modifications and variations of the preferred embodiment described above are possible and will become apparent to those skilled in the art in light of this specification. For example, many functions and advantages are described for the preferred embodiment, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims.

I claim:

1. A flywheel energy storage system, comprising:
   an energy storage flywheel supported for rotation on a bearing system;
   a brushless motor and a brushless permanent magnet generator connected to said flywheel for accelerating and decelerating said flywheel for storing and retrieving energy;
   a multiplicity of windings magnetically coupled in a plurality of combinations of various numbers of windings for outputting power produced by rotation of said flywheel;
   an output regulator circuit for providing a variable DC voltage that is maintained within an allowable range for connected loads as the flywheel slows during discharging;
   said output regulator circuit includes switches for switching connections of said windings to change the number of said windings coupled to said output to maintain said output power DC voltage within said allowable range;
   said switching occurs less than once per every 10 revolutions of said flywheel.

2. A flywheel energy storage device as described in claim 1, wherein:
   said magnetic coupling is located in said generator of said flywheel system with said windings being the coils of said generator.

3. A flywheel energy storage device as described in claim 2, wherein:
   said coils of said generator produce multiple phases of output power that are rectified and smoothed with capacitors and then combined electrically in series to provide said DC voltage.

4. A flywheel energy storage device as described in claim 2, wherein:
   said coils of said generator produce multiple phases of output power that are rectified and combined electrically in parallel to provide said DC voltage.

5. A flywheel energy storage device as described in claim 1, wherein:
   said DC voltage varies from a high voltage to a low voltage between two and ten times during a full discharge of said flywheel energy storage system.

6. A flywheel energy storage device as described in claim 1, wherein:
   said brushless motor and said brushless permanent magnet generator are combined.

7. A flywheel energy storage device as described in claim 1, wherein:
   said DC voltage varies more than 5% but less than 35% from its maximum voltage when maintained within said allowable range during discharging of said flywheel energy storage device.

8. A flywheel energy storage device as described in claim 1, wherein:
   said connected load is comprised of telecommunication equipment.

9. A flywheel energy storage device as described in claim 1, wherein:
   said connected load is an inverter for converting said DC voltage to AC.

10. A flywheel energy storage device as described in claim 1, wherein:
    said magnetic coupling is located in a transformer that is electrically connected to the generator output with said windings being the secondary and or primary coils of said transformer.

11. A flywheel energy storage system, comprising:
    an energy storage flywheel supported for rotation on a bearing system;
    a brushless motor and a brushless permanent magnet generator for accelerating and decelerating said flywheel for storing and retrieving energy, said generator having windings for a magnetic coupling for providing output power,
    an output regulator circuit for providing a DC voltage that is maintained within an allowable range for connected loads as the flywheel slows during discharging;
    said DC voltage is maintained within said allowable range by switching connections of numbers of windings of said magnetic coupling;
    said magnetic coupling is located in said generator of said flywheel system with said windings being the coils of said generator.

12. A flywheel energy storage device as described in claim 11, wherein:
    said DC voltage varies more than 5% but less than 35% from its maximum voltage when maintained within said allowable range.

13. A flywheel energy storage device as described in claim 11, wherein:
    said switching occurs less than once per every 10 revolutions of said flywheel.

14. A flywheel energy storage device as described in claim 11, wherein:
    said connected load comprises an inverter for converting said DC voltage to AC.

15. A flywheel energy storage device as described in claim 11, wherein:
    said DC voltage varies from a high voltage to a low voltage between two and ten times during a fill discharge of said flywheel energy storage system.

16. A flywheel energy storage device as described in claim 11, wherein:
    said coils for said motor that accelerate said flywheel are electrically isolated from coils for said generator that decelerate said flywheel.

17. A method of using a flywheel energy storage device as described in claim 11 wherein:

said DC voltage varies from a high voltage to a low voltage between two and ten times during a full discharge of said flywheel energy storage system.

18. A method of generating electrical power, in a flywheel energy storage device, at an output voltage that is maintained within an allowable voltage range, comprising:

energizing a brushless motor to accelerate a flywheel in said flywheel energy storage device to rotate and store energy in a form of rotational inertia;

retrieving said stored energy in the form of electrical power by driving a brushless permanent magnet generator with said rotational inertia of said flywheel, said stored energy retrieval including generating a DC voltage in a multiplicity of windings of a magnetic coupling that provides output power, and maintaining said DC voltage within an allowable range for connected loads as the flywheel slows during discharging;

said DC voltage is maintained within said allowable range by switching connections of said windings with an output regulator circuit to couple a number of said windings that produces said voltage within said allowable voltage range at a speed at which said flywheel is turning;

said magnetic coupling is located in a generator of the flywheel system, with said windings being the coils of said generator.

* * * * *